United States Patent
Isobe et al.

(10) Patent No.: US 10,087,329 B2
(45) Date of Patent: Oct. 2, 2018

(54) TITANIUM DIOXIDE PIGMENT AND METHOD FOR MANUFACTURING SAME, AND COMPOSITION IN WHICH SAME IS BLENDED

(71) Applicant: Ishihara Sangyo Kaisha, Ltd., Osaka (JP)

(72) Inventors: Kaoru Isobe, Yokkaichi (JP); Norihiko Sanefuji, Yokkaichi (JP); Yasutsune Tanida, Yokkaichi (JP); Kensuke Ohsaki, Yokkaichi (JP)

(73) Assignee: ISHIHARA SANGYO KAISHA, LTD, Osaka (JP)

( * ) Notice: Subject to any disclaimer, the term of this patent is extended or adjusted under 35 U.S.C. 154(b) by 50 days.

(21) Appl. No.: 15/319,307

(22) PCT Filed: Jun. 12, 2015

(86) PCT No.: PCT/JP2015/066967
§ 371 (c)(1),
(2) Date: Dec. 15, 2016

(87) PCT Pub. No.: WO2015/194466
PCT Pub. Date: Dec. 23, 2015

(65) Prior Publication Data
US 2017/0130055 A1    May 11, 2017

(30) Foreign Application Priority Data

Jun. 17, 2014 (JP) .................. 2014-123931

(51) Int. Cl.
| | |
|---|---|
| *C09C 1/36* | (2006.01) |
| *C09C 3/06* | (2006.01) |
| *C08K 3/22* | (2006.01) |
| *C08K 9/02* | (2006.01) |
| *C08K 9/06* | (2006.01) |
| *C08K 9/08* | (2006.01) |
| *C09C 3/08* | (2006.01) |
| *C09C 3/12* | (2006.01) |

(52) U.S. Cl.
CPC .............. *C09C 1/3661* (2013.01); *C08K 3/22* (2013.01); *C08K 9/02* (2013.01); *C08K 9/06* (2013.01); *C08K 9/08* (2013.01); *C09C 1/36* (2013.01); *C09C 1/3669* (2013.01); *C09C 1/3684* (2013.01); *C09C 3/06* (2013.01); *C09C 3/063* (2013.01); *C09C 3/08* (2013.01); *C09C 3/12* (2013.01); *C01P 2004/62* (2013.01); *C01P 2004/84* (2013.01); *C01P 2006/60* (2013.01); *C08K 2003/2241* (2013.01); *C08K 2003/2244* (2013.01); *C08K 2201/003* (2013.01); *C08K 2201/006* (2013.01)

(58) Field of Classification Search
CPC ... C09C 1/3661; C09C 1/3684; C09C 1/3669; C09C 3/063; C09C 3/12; C09C 3/08; C09C 1/36; C09C 3/06; C08K 9/02; C08K 9/06; C08K 9/08; C08K 2003/2241; C08K 2003/2244; C08K 2201/003; C08K 3/22; C01P 2004/62; C01P 2004/84; C01P 2006/60

See application file for complete search history.

(56) References Cited

U.S. PATENT DOCUMENTS

| | | | |
|---|---|---|---|
| 5,242,880 A | 7/1993 | Irick | |
| 6,383,980 B1 | 5/2002 | Hagihara | |
| 6,576,052 B1 | 6/2003 | Takahashi et al. | |
| 6,605,147 B2 * | 8/2003 | Rentschler | ............ C09C 1/3661 |
| | | | 106/14.05 |
| 2005/0129602 A1 * | 6/2005 | Takahashi | ............ C09C 1/3684 |
| | | | 423/274 |

FOREIGN PATENT DOCUMENTS

| | | | |
|---|---|---|---|
| EP | 1354628 A1 | 10/2003 | |
| EP | 2105482 A1 * | 9/2009 | ........... C01G 23/047 |
| EP | 2105482 A1 | 9/2009 | |
| JP | 11-269303 A1 | 10/1999 | |
| JP | 2006 182896 A1 | 7/2006 | |
| JP | 2006 233343 A1 | 9/2006 | |
| JP | 3992982 | 8/2007 | |
| JP | 2008/150480 A1 | 7/2008 | |
| JP | 4233324 B | 3/2009 | |

OTHER PUBLICATIONS

Supplementary European Search Report issued in European Patent Application No. EP 15 809 265.0, dated Jan. 12, 2018, pp. 1-2.
European Examination Report issued in European Patent Application No. EP 15 809 265.0, dated Jan. 12, 2018, pp. 1-5.

* cited by examiner

*Primary Examiner* — Anthony J Green
(74) *Attorney, Agent, or Firm* — Jeffrey S. Melcher; Manelli Selter PLLC

(57) ABSTRACT

Provided is a titanium dioxide pigment having minimal yellow color and minimal yellowing due to exposure, i.e., good yellowing resistance and high pigment performance such as brightness. Also provided is a titanium dioxide pigment which has a reduced amount of volatile moisture and which does not readily decompose when blended with a resin or the like. In the present invention, a compound including 0.05-20% by mass of phosphorus and an alkaline earth metal is present on surfaces of titanium dioxide particles having an average particle diameter of 0.15-1.0 μm. The titanium dioxide pigment is manufactured by mixing an alkaline earth metal compound, a phosphate compound, and titanium dioxide particles having an average particle diameter of 0.15-1.0 μm, and bonding the compound including phosphorus and an alkaline earth metal to the titanium dioxide particles.

22 Claims, No Drawings

TITANIUM DIOXIDE PIGMENT AND METHOD FOR MANUFACTURING SAME, AND COMPOSITION IN WHICH SAME IS BLENDED

This application is the national phase of international application PCT/JP2015/066967 filed 12 Jun. 2015 which designated the U.S.

TECHNICAL FIELD

The present invention relates to a titanium dioxide pigment and a method for manufacturing the same, and a composition in which the same is blended. More specifically, the present invention relates to a titanium dioxide pigment having pigment performances such as low yellowness and low yellowing degree due to exposure, namely good yellowing resistance, and high brightness. And, the present invention further relates to a titanium dioxide pigment capable of reducing volatile moisture as well as being suitably blended into a composition of resin or the like.

BACKGROUND ART

A titanium dioxide pigment is the white pigment excellent in hiding power/tinting strength (i.e. hiding power and tinting strength). Therefore, a titanium dioxide pigment is blended into a coating material, an ink, a resin, or the like for use as colorant. Since a titanium dioxide pigment has high surface catalytic activity, a composition blending it has the low light resistance, the low weather resistance, the severe deterioration with time, the intense yellowness, and the poor yellowing resistance such as the large yellowing degree or the like due to exposure. Accordingly, as a technique of suppressing the catalytic activity of a titanium dioxide pigment, a technique of coating its surface with an inorganic compound of silica, alumina, or the like is known. In addition, as a technique of suppressing yellowing degree of a titanium dioxide pigment, a technique of treating its surface with organosilicon compounds is known.

When a resin composition is blended with a titanium dioxide pigment and is processed and molded at high temperature, surface defects tend to occur which are generally referred to as silver streaks, lacing (foaming), pinholes and the like. It is said that such surface defects are caused by the volatile moisture due to crystallization water and adsorption water which the titanium dioxide particles constituting the titanium dioxide pigment have, and by the volatile moisture due to crystallization water and adsorption water generated from the surface coating layer which is made of an inorganic compound of silica, alumina, or the like and which is treated to suppress the catalytic activity of the titanium dioxide particles for improvement in the light resistance and the weather resistance. In particular, since the desorption of crystallization water from the surface coating layer which is made from an inorganic compound formed by a wet method occurs at high temperature, it is assumed that the desorbed crystallization water forms into volatile moisture to cause the surface defects. Furthermore, the volatile moisture causes the hydrolysis reaction of the resin, resulting in problems that the strength of the resin decreases and the discoloration occurs. Simply, these problems are collectively referred to as "a reduction in the heat resistance of a resin".

In order to prevent the reduction in the heat resistance of a resin, Patent Literature 1 discloses a method for coating the surfaces of titanium dioxide particles with silica and alumina and then reducing the amount of volatile moisture to a predetermined value or less by firing them. Patent Literature 2 discloses a titanium dioxide pigment having a specific amount of Karl Fischer moisture wherein the surface of the titanium dioxide pigment is formed from the following layers: a coating layer including an aluminum phosphate compound on the surfaces of titanium dioxide particles; and a coating layer including a hydrolysis product of an organosilane compound. Patent Document 3 discloses optically functional particles in which an alkaline earth metal and a condensed phosphate are present on titanium dioxide particles having an average primary particle diameter of 0.001 to 0.1 µm, which are quite different from a pigment. Specifically, Patent Document 3 discloses a material having the following functions and properties: optical functions such as photocatalytic function, ultraviolet absorbing capacity, and transparency; and hydrophilic properties.

CITATION LIST

Patent Literature

Patent Literature 1: JP 2006-182896 A
Patent Literature 2: Japanese Patent No. 3992982 B
Patent Literature 3: Japanese Patent No. 4233324 B

SUMMARY OF INVENTION

Technical Problem

By using the techniques of Patent Literatures 1 and 2, the amount of volatile moisture can be reduced up to a limited extent. However, the above techniques have the problem that both the heat resistance of the resin and the weather resistance/light resistance (i.e. weather resistance and light resistance) of the titanium dioxide pigment are difficult to sufficiently achieve with a good balance. This is because it is impossible to increase the amount of the inorganic compound coated on the surfaces of the titanium dioxide particles up to the level needed to sufficiently achieve a reduction of the amount of moisture. As a result, the above techniques cause the following problems: the pigment is intensely tinged with yellow color; the poor yellowing resistance occurs; and the yellowing degree or the like due to exposure is large. The technique of Patent Literature 3 relates to a titanium dioxide particulate material having optical functions such as photocatalytic function, ultraviolet absorbing capacity and transparency, which requires the properties inconsistent with the use as a white pigment. Additionally, in the technique of Patent Literature 3, no consideration is given to the heat resistance of the resin. Furthermore, the titanium dioxide particulate material disclosed therein is characterized by high hydrophilicity, and thus has a large amount of moisture. As a result, it is expected that the heat resistance of the resin which is blended with the titanium dioxide particulate material should become low.

The purpose of the present invention is to solve the current problems described above, and is to provide a titanium dioxide pigment having pigment performances such as low yellowness, low yellowing degree due to exposure, and high brightness. Another purpose of the present invention is to provide a titanium dioxide pigment which reduces the amount of volatile moisture as well as which does not readily decompose when blended into a composition such as a resin.

Solution to Problem

As a result of the earnest research by the present inventors, they have found that a titanium dioxide pigment having pigment performances such as low yellowness, low yellowing degree due to exposure, and high brightness can be obtained using titanium dioxide particles with a specific particle diameter, wherein a specific amount of a compound including phosphorus and an alkaline earth metal are present on the surfaces of the titanium dioxide particles. Also, the present inventors have found that the use of this titanium dioxide pigment can reduce the amount of volatile moisture thereof, and that the composition of the resin or the like, blended with this pigment has the heat resistance, weather resistance and light resistance. Accordingly, the present invention has been accomplished.

Namely, the present invention relates to a titanium dioxide pigment comprising titanium dioxide particles having an average particle diameter of 0.15 to 1.0 µm, wherein 0.05 to 20 mass % of a compound including phosphorus and an alkaline earth metal is present on the surfaces of the titanium dioxide particles.

Also, the present invention relates to a method for manufacturing a titanium dioxide pigment comprising: mixing titanium dioxide particles having an average particle diameter of 0.15 to 1.0 µm, a phosphoric acid compound and an alkaline earth metal compound; and attaching the compound including phosphorus and an alkaline earth metal to the titanium dioxide particles.

More specifically the present invention is described as follows.

(1) A titanium dioxide pigment comprising titanium dioxide particles having an average particle diameter of 0.15 to 1.0 µm, wherein 0.05 to 20 mass % of a compound including phosphorus and an alkaline earth metal is present on surfaces of the titanium dioxide particles.

(2) The titanium dioxide pigment according to (1), wherein a value of (a BET diameter of the titanium dioxide pigment)/(a median diameter of the titanium dioxide pigment) is 0.04 or more.

(3) The titanium dioxide pigment according to (1) or (2), wherein a value of (a difference (ppm) between a Karl Fischer moisture of the titanium dioxide pigment at 300° C. and a Karl Fischer moisture of the titanium dioxide pigment at 100° C.)/(a total amount (mass %) of an inorganic compound(s) present on a surface of the titanium dioxide pigment, the amount being used to treat the surface) is 3500 or less.

(4) The titanium dioxide pigment according to any one of (1) to (3), wherein a color difference Δb of a difference between a b-value of a powder color in a Hunter color system of the titanium dioxide pigment in which the compound including phosphorus and an alkaline earth metal is present and a b-value of a powder color in the color system of the titanium dioxide pigment before the compound including phosphorus and an alkaline earth metal is present is −0.1 or less.

(5) The titanium dioxide pigment according to any one of (1) to (4), wherein a compound including at least one element selected from the group consisting of silicon, aluminum, titanium, tin, zirconium, and antimony and the compound including phosphorus and an alkaline earth metal are present on the surfaces of the titanium dioxide particles.

(6) The titanium dioxide pigment according to (5), wherein the compound including at least one element selected from the group consisting of silicon, aluminum, titanium, tin, zirconium and antimony is present on the surfaces of the titanium dioxide particles, and the compound including phosphorus and an alkaline earth metal is present on an outside thereof.

(7) The titanium dioxide pigment according to (5), wherein the compound including phosphorus and an alkaline earth metal is present on the surfaces of the titanium dioxide particles, and the compound including at least one element selected from the group consisting of silicon, aluminum, titanium, tin, zirconium and antimony is present on an outside thereof.

(8) The titanium dioxide pigment according to any one of (5) to (7), wherein the compound including at least one element selected from the group consisting of silicon, aluminum, titanium, tin, zirconium and antimony is at least one selected from the group consisting of an oxide thereof, a hydroxide thereof, and a hydrous oxide thereof.

(9) The titanium dioxide pigment according to any one of (1) to (8), wherein the alkaline earth metal is at least one selected from the group consisting of calcium, magnesium, strontium, and barium.

(10) The titanium dioxide pigment according to any one of (1) to (9), further comprising an organic compound, wherein the organic compound is attached to a surface of the titanium dioxide pigment.

(11) The titanium dioxide pigment according to (10), wherein the organic compound is at least one organic compound selected from the group consisting of organosilicon compounds and polyols.

(12) A method for manufacturing a titanium dioxide pigment, comprising:

mixing titanium dioxide particles having an average particle diameter of 0.15 to 1.0 µm, a phosphoric acid compound, and an alkaline earth metal compound; and attaching a compound including the phosphorus and the alkaline earth metal to the titanium dioxide particles.

(13) The method for manufacturing a titanium dioxide pigment according to (12), comprising:

preparing an aqueous slurry including the titanium dioxide particles having an average particle diameter of 0.15 to 1.0 µm, the phosphoric acid compound, and the alkaline earth metal compound; and adjusting a pH of the aqueous slurry, thereby attaching the compound including the phosphorus and the alkaline earth metal to the titanium dioxide particles.

(14) A method for manufacturing a titanium dioxide pigment, comprising attaching a compound including phosphorus and an alkaline earth metal and a compound including at least one element selected from the group consisting of silicon, aluminum, titanium, tin, zirconium, and antimony to titanium dioxide particles having an average particle diameter of 0.15 to 1.0 µm.

(15) The method for manufacturing a titanium dioxide pigment according to (14), comprising:

mixing the titanium dioxide particles and the compound including at least one element selected from the group consisting of silicon, aluminum, titanium, tin, zirconium and antimony, thereby attaching the compound including the at least one element to the titanium dioxide particles; and subsequently mixing a phosphoric acid compound and an alkaline earth metal compound, thereby attaching the compound including phosphorus and an alkaline earth metal to the titanium dioxide particles.

(16) The method for manufacturing a titanium dioxide pigment according to (14), comprising:

mixing the titanium dioxide particles, a phosphoric acid compound, and an alkaline earth metal compound, thereby attaching the compound including phosphorus and an alkaline earth metal to the titanium dioxide particles; and subsequently mixing the titanium dioxide particles and the compound including at least one element selected from the group consisting of silicon, aluminum, titanium, tin, zirconium and antimony, thereby attaching the compound including the at least one element to the titanium dioxide particles.

(17) The method for manufacturing a titanium dioxide pigment according to any one of (14) to (16), wherein the compound including at least one element selected from the group consisting of silicon, aluminum, titanium, tin, zirconium and antimony is attached to the titanium dioxide particles and is at least one selected from the group consisting of an oxide thereof, a hydroxide thereof, and a hydrous oxide thereof.

(18) A method for manufacturing a titanium dioxide pigment, comprising further firing the titanium dioxide pigment manufactured by the method according to any one of (12) to (17).

(19) A method for manufacturing a titanium dioxide pigment comprising further attaching an organic compound to the titanium dioxide pigment manufactured by the method according to any one of (12) to (18).

(20) The method for manufacturing a titanium dioxide pigment according to (19), wherein the organic compound is at least one organic compound selected from the group consisting of organosilicon compounds and polyols.

(21) A composition comprising the titanium dioxide pigment according to any one of (1) to (11).

Advantageous Effects of Invention

The titanium dioxide pigment of the present invention has pigment performances such as low yellowness and low yellowing degree due to exposure, namely good yellowing resistance, and high brightness. The titanium dioxide pigment can reduce the amount of volatile moisture and does not readily decompose when blended into a composition such as a resin. Furthermore, according to the present invention, such a titanium dioxide pigment can be easily manufactured, so that a composition such as a resin, blended with the pigment can be provided at low cost.

DESCRIPTION OF EMBODIMENTS

The titanium dioxide pigment of the present invention comprises a titanium dioxide pigment comprising titanium dioxide particles having an average particle diameter of 0.15 to 1.0 µm, wherein 0.05 to 20 mass % of a compound including phosphorus and an alkaline earth metal is present on the surfaces of the titanium dioxide particles.

The titanium dioxide particles which are the base of the titanium dioxide pigment of the present invention have an average particle diameter of 0.15 to 1.0 µm. The average particle diameter means the average primary particle diameter, obtained by a microscope method. More specifically, the pigment particles are photographed with a transmission electron microscope (H-7000 manufactured by Hitachi High-Technologies Corporation). Using an image processing analyzer (LUZEX AP manufactured by NIRECO Corporation), the equivalent circle diameter of each of not less than 1000 primary particles in the image is calculated from the projected area, thereby calculating the number average diameter thereof as the average particle diameter. The average particle diameter within the range of 0.15 to 1.0 µm results in high hiding power and tinting strength, and thus the titanium dioxide particles having the average particle diameter within the above range is preferable as a titanium dioxide pigment used in the composition of resin or the like. The average particle diameter of the titanium dioxide particles is preferably 0.2 to 0.5 µm, more preferably 0.2 to 0.3 µm.

The crystal structure of the titanium dioxide particles may be any of anatase-type, rutile-type and brookite-type, and may be a mixture of two or more of them. In particular, rutile-type is preferable from the viewpoint of reducing the catalytic activity and enhancing the brightness. The method for manufacturing it is not limited, and, for example, any of a so-called sulfuric acid method for hydrolyzing a titanium sulfate solution and a so-called chlorine method for oxidizing a titanium halide in gas phase may be employed.

In the titanium dioxide pigment of the present invention, a compound including phosphorus and an alkaline earth metal is present on the surfaces of the titanium dioxide particles. The compound has only to include phosphorus and an alkaline earth metal. The bonding state like an alkaline earth metal phosphate compound is preferable. However, the state including phosphoric acid and an alkaline earth metal compound such as an oxide of alkaline earth metal (which is also referred to as "alkaline earth metal oxide") or a hydroxide of alkaline earth metal (which is also referred to as "alkaline earth metal hydroxide") may be used.

The ratio between the phosphorus and the alkaline earth metal may be optionally set. The compound may be in the state of crystalline or amorphous. The presence of these elements may be confirmed by a known analytical method. For example, X-ray fluorescence analysis and ICP emission spectroscopy of the pigment powder, and energy dispersive X-ray spectroscopy, Auger electron spectroscopy, and X-ray photoelectron spectroscopy of the pigment particle surface can be employed.

The examples of the alkaline earth metal include calcium, magnesium, strontium and barium, and one or two or more thereof may be used. In particular, the use of calcium or magnesium gives pigment performances such as low yellowness and low yellowing degree due to exposure, namely good yellowing resistance, and high brightness. In other words, the powder color can have a high L-value (index of brightness), a low b-value (index of yellowness) and a low yellowing degree $\Delta YI$ (difference between yellowness YI before and that after exposure), so that when the pigment is kneaded with a resin or the like and processed, the molded product also can have a high L-value, a low b-value and a low $\Delta YI$, and what is more, an effect to further reduce the decomposition of the resin due to heating can be more easily obtained, which are preferred. The use of calcium is particularly preferred.

Phosphorus may be present in any form, preferably as a salt of phosphoric acid and the alkaline earth metal (i.e. phosphate). The examples of the phosphate include an orthophosphate, a polyphosphate having $PO_4$ tetrahedrons linked in a P—O—P chain form, a metaphosphate having $PO_4$ tetrahedrons linked in a P—O—P ring form, and an ultraphosphate having an inorganic polymer linked in a network form, and one or two or more of them may be used. Preferably, the phosphate has a lower crystallinity. This is because when the phosphate having a lower crystallinity is kneaded with a resin or the like and processed (which are referred to as "kneading and processing"), a molded product having high weather resistance can be obtained. The crystallinity can be confirmed by X-ray diffraction analysis (Ultima IV manufactured by Rigaku Corporation).

The presence amount of the compound including phosphorus and an alkaline earth metal with regard to the titanium dioxide pigment is 0.05 to 20 mass %. Specifically, this amount is calculated as follows. The amounts of phosphorus and the alkaline earth metal which are included in the above compound are measured by X-ray fluorescence analysis (RIX 2100 manufactured by Rigaku Corporation). And then, the measured amount of the phosphorus is converted into the mass of $P_2O_5$, and the measured amount of the alkaline earth metal into the mass of a divalent alkaline earth metal oxide (MO). Subsequently, these converted amounts are summed up, and calculated on condition that the mass of the whole titanium dioxide pigment is 100%. Within the above range, the titanium dioxide pigment having pigment performances such as low yellowness, low yellowing degree due to exposure, and high brightness can be obtained. Furthermore, the titanium dioxide pigment which does not readily decompose when blended into a composition of resin or the like can be obtained because of reducing the amount of volatile moisture. In the case of an amount less than the above range, the composition of resin or the like cannot have sufficient weather resistance/light resistance. In the case of an amount more than the above range, the heat resistance of the resin composition decreases. In this respect, it is assumed that this occurs due to the bound water contained in the compound including phosphorus and an alkaline earth metal. The presence amount is preferably 0.1 to 10 mass %, more preferably in the range of 0.5 to 7.0 mass %.

The presence form of the compound including phosphorus and an alkaline earth metal, present on titanium dioxide particles is not particularly limited. For example, the whole particle may be coated in a layer as a coating film, a part of the coating film may have holes, or the coating film may be a discontinuous coating film such as a coating film present in a state of the island shape. The pigment particles are preferably coated in a layer. This is because the pigment particles which are coated in a layer can have a reduced specific surface area, reduced adsorption moisture, and a reduced catalytic activity. The thickness of the coating film may be uniform or non-uniform. The coating film may be in a state of a smooth film or in a state of fine particles deposited, without specific limitations.

In the titanium dioxide pigment of the present invention, the compound including phosphorus and an alkaline earth metal, present on the surface thereof has a mass ratio R of the phosphorus to the alkaline earth metal, preferably in the range of 0.5 to 2.0. In the case where the ratio R is within the above range, the molded product obtained by being kneaded with a resin or the like and being processed (which are referred to as a "kneading and processing") can easily give the effect of improving the weather resistance, thereby obtaining a titanium dioxide pigment having pigment performances such as lower yellowness, lower yellowing degree due to exposure, and higher brightness. Furthermore, a titanium dioxide pigment which more reduces the amount of volatile moisture as well as which does not readily decompose when blended into a composition of resin or the like can be obtained. The ratio R is particularly preferably in the range of 0.8 to 1.0. The ratio R is obtained by the following method. The amounts of phosphorus and the alkaline earth metal are measured by the X-ray fluorescence analysis, as described above. And then, the measured amount of the phosphorus is converted into the mass of $P_2O_5$, and the measured amount of the alkaline earth metal into the mass of a divalent alkaline earth metal oxide (MO), and the value of $P_2O_5/MO$ is defined as R.

It is preferable that the titanium dioxide pigment of the present invention has an L-value (index of brightness) of 95 or more as an index value of the powder color (in the Hunter color system). Also, it is preferable that the titanium dioxide pigment of the present invention has a b-value (index of yellowness) of 2.0 or less as an index value of the powder color (in the Hunter color system). The compound including phosphorus and an alkaline earth metal, described above can have an L-value of 95 or more and a b-value of 1.7 or less as index values of a powder color when being properly present on the surfaces of the titanium dioxide particles. Since the titanium dioxide pigment having a high degree of brightness can be thus obtained according to the present invention, the brightness of a composition of resins or the like including this titanium dioxide pigment can be enhanced. In addition, since a titanium dioxide pigment having a low b-value can be obtained, the yellowness of a molded product obtained by kneading this pigment with a resin or the like is suppressed, so that a more preferred color tone can be obtained. The powder color (in the Hunter color system) is measured as follows. An aluminum ring having a diameter of 30 mm is filled with 2.0 g of a sample, and then is compressed under a pressure of 10 MPa by a pressing machine. After that, in the Hunter color system, the L-value, a-value (index of redness) and b-value of the sample were measured using a color computer SM-5 manufactured by Suga Test Instruments Co., Ltd. The L-value is preferably 96.0 or more, and the b-value is preferably 1.0 to 1.7. When the color difference Δb are measured as the difference between a b-value of a powder color (in the Hunter color system) of a titanium dioxide pigment in which the compound including phosphorus an alkaline earth metal is present and a b-value of a powder color (in the Hunter color system) of a titanium dioxide pigment before the same is present, the degree of reduction in yellowness resulting from the presence of the compound including phosphorus and an alkaline earth metal can be found. The color difference Δb is preferably −0.1 or less, more preferably −0.3 or less, still more preferably −0.5 or less. The color difference Δb is calculated from the following expression.

Δb=(b-value of a powder color of a titanium dioxide pigment in which a compound including phosphorus and an alkaline earth metal is present)− (b-value of a powder color of a titanium dioxide pigment before the above compound including phosphorus and an alkaline earth metal is present)  [Expression 1]

The yellowing degree of a composition blended with the titanium dioxide pigment is calculated as yellowing degree ΔYI by the measurement of tristimulus values of a composition before and after exposure to black light for 21 days in accordance with JIS K7373, using a color computer SM-5 manufactured by Suga Test Instruments Co., Ltd. A composition with a low yellowing degree has a low degree of color change into yellow by the exposure. Specifically, the yellowing degree measured by the method described in the Examples of this application is preferably 10 or less, more preferably 5 or less, still more preferably 3 or less.

The titanium dioxide pigment of the present invention has a value of BET diameter/median diameter which is preferably 0.04 or more. The value is an index representing the smoothness of the pigment particle surface. This value, when the compound including phosphorus and an alkaline earth metal described above is properly present on the surfaces of the titanium dioxide particles, can be in the range of 0.04 or more, more preferably 0.2 or more, still more preferably 0.3 or more. With a BET diameter/median diameter of 0.04 or more, the adsorption moisture of pigment particles can be reduced, so that the heat resistance of a composition of resin or the like, in particular, can be improved. The BET diameter is the particle diameter calculated from the following expression based on the specific area obtained by a nitrogen gas adsorption-desorption method (BET method).

$$\text{BET diameter (μm)}=6/(\text{BET specific surface area (m}^2\text{/g)}\times\text{specific gravity (g/cm}^3\text{))} \quad \text{[Expression 2]}$$

The value of specific gravity for use is 4.27 g/cm$^3$ for rutile-type titanium dioxide particles as a base of the titanium dioxide pigment, and 3.90 g/cm$^3$ for anatase-type. The BET specific surface area is measured by nitrogen gas adsorption-desorption method. The median diameter is the median diameter of volume-based particle size distribution measured by a laser diffraction particle size distribution analyzer. The sample has a refractive index of 2.75. Water is used as dispersion medium, having a refractive index of 1.33. The value of BET diameter/median diameter is preferably in the range of 0.04 to 1.0, more preferably in the range of 0.2 to 0.8, still more preferably 0.3 to 0.8.

In the titanium dioxide pigment of the present invention, a value of (a difference between a Karl Fischer moisture at 300° C. and a Karl Fischer moisture at 100° C. (ppm))/(a total treatment amount (mass %) of the surface of the titanium dioxide pigment by an inorganic compound(s)) is preferably 3500 or less, more preferably 2000 or less. When the compound including phosphorus and an alkaline earth metal described above is properly present on the surfaces of the titanium dioxide particles, the above value can be 3500 or less. And, in the case where a difference between a Karl Fischer moisture at 300° C. and a Karl Fischer moisture at 100° C. per a total amount (mass %) of an inorganic compound(s) present on a surface of the titanium dioxide pigment, the amount being used to treat the surface is 3500 or less, the volatile moisture in the whole pigment particles can be reduced, so that the heat resistance of the composition of resin or the like can be improved, in particular. The difference between a Karl Fischer moisture at 300° C. and that at 100° C., (which is referred to as "ΔKF" hereinafter) is obtained as follows. A titanium dioxide pigment is left standing in a constant-temperature and humidity chamber at a temperature of 25° C., and a relative humidity of 55% for 24 hours. After an equilibrium state is reached, the measurements of the Karl Fischer moistures at 100° C. and 300° C. in 1 g of the sample are performed using a Karl Fischer moisture measuring apparatus and a moisture vaporization apparatus attached thereto, and the difference between these moistures is calculated. Regarding the total treatment amount (mass %) of the surface of the titanium dioxide pigment by an inorganic compound(s), the numerical value of the presence amount of the compound including phosphorus (in terms of P$_2$O$_5$) and an alkaline earth metal (in terms of MO), obtained in X-ray fluorescence analysis as described above is used. Also, in the case where a compound including at least one element selected from the group consisting of silicon, aluminum, titanium, tin, zirconium and antimony is present as described below, the total treatment amount (mass %) of the surface of the titanium dioxide pigment by an inorganic compound(s) is calculated by introducing their presence amounts (in terms of SiO$_2$, Al$_2$O$_3$, TiO$_2$, SnO$_2$, ZrO$_2$, and Sb$_2$O$_3$) therein. Also, in the case where another inorganic compound is present on the surface, the amount in terms of their normal oxides is added in the above calculation. In contrast, in the case where an organic compound is present on the surface, the amount thereof is not added in the above calculation. The value of ΔKF (ppm)/the total treatment amount (mass %) of the surface of the titanium dioxide pigment by an inorganic compound(s) is preferably 1000 or less, more preferably in the range of 500 or less. The ΔKF is preferably in the range of 3500 ppm or less, more preferably 2500 ppm or less, still more preferably 1500 ppm or less.

In the titanium dioxide pigment of the present invention, a compound including at least one element selected from the group consisting of silicon, aluminum, titanium, tin, zirconium and antimony (which is sometimes referred to as an "inorganic compound" hereinafter) in addition to a compound including phosphorus and an alkaline earth metal may be present on the surface of the titanium dioxide particles. With such a structure, the weather resistance/light resistance of a composition of resin or the like can be further improved.

The compound including phosphorus and an alkaline earth metal and the above inorganic compound may be present on the surface of titanium dioxide particles in state of separate layers or may be present as a mixture thereof, but these states are not particularly limited. The term "present as a mixture" means any of the state which is present as an approximately uniform mixture, the state mixed by a concentration distribution in the coating, the state of a composite oxide formed from constitutional elements, and the state of a combination thereof. In the case of the presence in a layer state, each of the compounds may be present in structure of one layer, or one or both of the compounds may be present in structure of a plurality of layers. For example, the layered structure may be the following: the inorganic compound layer/a compound layer including phosphorus and an alkaline earth metal in order from the inside; the compound layer including phosphorus and an alkaline earth metal/the inorganic compound layer; or the compound layer including phosphorus and an alkaline earth metal/the inorganic compound layer/the compound layer including phosphorus and an alkaline earth metal. The inorganic compound layer may include the one or two or more of silicon, aluminum, titanium, tin, zirconium and antimony. The two or more elements may be mixed to form one layer. Alternatively, a plurality of layers including the one or two or more of these elements may be stacked.

In the present invention, it is preferable that the inorganic compound layer is in direct contact with the surfaces of titanium dioxide particles as well as that the compound layer including phosphorus and an alkaline earth metal is present outside thereof. This structure can reduce the amount of volatile moisture of the titanium dioxide pigment, and can further reduce the catalytic activity. As a result, regarding a composition of resin or the like using the pigment, both its heat resistance and its weather resistance/light resistance are achievable with a good balance at higher levels. A titanium dioxide pigment having pigment performances such as low yellowness and low yellowing degree due to exposure, namely good yellowing resistance, and high brightness can be therefore obtained. Furthermore, a titanium dioxide pigment which more reduces the amount of volatile moisture as well as which does not readily decompose when blended into a composition of resin or the like can be obtained The interface of each layer may be in a clearly distinguishable state, or the vicinity of the interface of each layer may be the state which is present as a mixture thereof. However, its state is not particularly limited. Furthermore, the interface may be flat and smooth or complicated, but the state is not particularly limited. The presence form of the inorganic compound is not particularly limited. For example, the whole particle may be coated to be in a layer state of a coating film, a part of the coating film may have holes, or the coating film may be a discontinuous coating film such as a coating film present in a state of the island shape. The particles are preferably coated to be in a layer state because of having effect of highly reducing catalytic activity. The thickness of the coating film may be uniform or non-uniform. The coating film may be formed from a smooth film or fine particles deposited, without specific limitations.

The presence amount of the above compound including at least one element selected from the group consisting of silicon, aluminum, titanium, tin, zirconium and antimony is preferably 5 mass % or less in terms of each of the oxides with regard to the whole titanium dioxide pigment. In the case of the presence amount more than the above range, the effect is saturated, and thus the above range is economically preferred. In the case of the compound of aluminum, titanium, zirconium and antimony, its coating amount is more preferably 3 wt % or less. In the case of the compound of silicon, its coating amount is more preferably 5 mass % or less, still more preferably 4 mass % or less. The presence amount of each of the above elements measured by X-ray fluorescence analysis is calculated in terms of $SiO_2$, $Al_2O_3$, $TiO_2$, $SnO_2$, $ZrO_2$, and $Sb_2O_3$ with regard to 100 mass % of the whole titanium dioxide pigment.

The type of the compound including at least one element selected from the group consisting of silicon, aluminum, titanium, tin, zirconium and antimony is not particularly limited, but is preferred to be at least one selected from the group consisting of each oxide of the above elements, each hydroxide of the above elements, and each hydrous oxide of the above elements. This is because the weather resistance/ light resistance of a composition of resin or the like can be effectively improved thereby. In particular, the oxide or hydroxide of silicon is preferred in view of the effective improvement in the weather resistance/light resistance of a composition of resin or the like. The oxide or hydroxide of silicon referred to as a dense silica in the present field is more preferred.

An organic compound may be attached to the surface of the titanium dioxide pigment of the present invention. The examples of the organic compound which can be used in the present invention include polyols; alkanolamines such as monoethanolamine, monopropanolamine, diethanolamine, dipropanolamine, triethanolamine, and tripropanolamine; a derivative of organic acid salts and the like, such as an acetate, an oxalate, a tartrate, a formate and a benzoate; and organosilicon compounds. The organic compound may be attached to cover the whole of the particle, or may be attached to a part of the particle surface. Among the organic compounds, the attachment of organosilicon compounds or polyols is particularly preferred.

Polyols can facilitate the dispersion of the titanium dioxide pigment in a composition of the resin or the like. Specific examples include trimethylolpropane, trimethylolethane, ditrimethylolpropane, trimethylolpropane ethoxylate, and pentaerythritol, and, in particular, trimethylolpropane and trimethylolethane are preferred. These polyols can be appropriately selected according to the type of resin or the like to be used.

The examples of the organosilicon compounds include organosilanes, organopolysiloxanes, organosilazanes and hydrolysis products thereof. The organosilicon compounds can highly hydrophobize a titanium dioxide pigment, and can substantially reduce the amount of volatile moisture with adsorption of water being suppressed. Furthermore, the organosilicon compounds can facilitate the dispersion of the titanium dioxide pigment in a composition of resin or the like, and can give low yellowness and suppress yellowing degree due to exposure. These organosilicon compounds can be appropriately selected according to the type of resin or the like to be used.

The specific examples of the organosilanes classified as organosilicon compounds include: (a) aminosilanes (e g aminopropyltriethoxysilane, N-β(aminoethyl)γ-aminopropyltriethoxysilane, and N-phenyl-γ-aminopropyltrimethoxysilane); (b) epoxysilanes (e.g. γ-glycidoxypropyltrimethoxysilane and β-(3,4-epoxycyclohexyl)ethyltrimethoxysilane); (c) methacrylsilanes (e.g. γ-(methacryloyloxypropyl) trimethoxysilane); (d) vinylsilanes (e.g. vinyltrimethoxysilane and vinyltriethoxysilane); (e) mercaptosilanes (e.g. 3-mercaptopropyltrimethoxysilane); (f) chloroalkylsilanes (e.g. 3-chloropropyltriethoxysilane); (g) alkylsilanes (e.g. n-butyltriethoxysilane, isobutyltrimethoxysilane, hexyltrimethoxysilane, hexyltriethoxysilane, hexylmethyldimethoxysilane, hexylmethyldiethoxysilane, cyclohexylmethyldiethoxysilane, octyltrimethoxysilane, octyltriethoxysilane, and decyltrimethoxysilane); (h) phenylsilanes (e.g. phenyltriethoxysilane); and (i) fluoroalkylsilanes (e.g. trifluoropropyltrimethoxysilane, tridecafluorooctyltrimethoxysilane); or the hydrolysis products thereof.

The examples of the organopolysiloxanes classified as organosilicon compounds include: (a) straight polysiloxanes (e.g. dimethylpolysiloxane, methyl hydrogen polysiloxane, methylmethoxy polysiloxane, and methylphenyl polysiloxane); (b) modified polysiloxanes (e.g. dimethylpolysiloxane diol, dimethylpolysiloxane dihydrogen, polysiloxanes amino-modified at a side chain or both ends, polysiloxanes epoxy-modified at a side chain or both ends or a single end, polysiloxanes methacryl-modified at both ends or a single end, polysiloxanes carboxyl-modified at a side chain or both ends, polysiloxanes carbinol-modified at a side chain or both ends or a single end, polysiloxanes phenol-modified at both ends, polysiloxanes mercapto-modified at a side chain or both ends, polysiloxanes polyether-modified at both ends or a side chain, polysiloxanes alkyl-modified at a side chain, polysiloxanes methylstyryl-modified at a side chain, polysiloxanes higher carboxylate-modified at a side chain, polysiloxanes fluoroalkyl-modified at a side chain, polysiloxanes alkyl-carbinol-modified at a side chain, polysiloxanes amino-modified at a side chain and carbinol-modified at both ends); and copolymers thereof.

The examples of the organosilazanes classified as organosilicon compounds further include hexamethylsilazane and hexamethylcyclotrisilazane.

Among the above organosilicon compounds, the organosilicon compounds having a hydrophobic functional group such as a methacryl group ($-OCOC(CH_3)=CH_2$), a vinyl group ($-CH=CH_2$), an alkyl group ($-R$), an aryl group (-Ph, $-Ar$, or the like), a carboxylate group ($-OCOR$), an acyl group ($-COR$), a polyether group ($-(R^1O)_n(R^2O)_m R^3$), a fluorine-containing group ($-(CH_2)_nCF_3$, $-(CF_2)_n CF_3$, or the like) or the like are more preferred, and organosilanes or organopolysiloxanes having a hydrophobic functional group are still more preferred. The organosilanes having a hydrolyzable group are further preferred.

In particular, in the case of blending with a general-purpose plastic resin as the resin, it is more preferable that the organosilanes having an alkyl group with 4 to 10 carbon atoms as hydrolyzable group, or hydrolysis products thereof, and dimethylpolysiloxane are used as the organosilicon compounds. Also, in the case of blending with an engineering plastic resin or super engineering plastic resin as the plastic resin, at least one selected from the group consisting of organosilanes having an alkyl group with 4 to 8 carbon atoms as hydrolyzable group, hydrolysis products thereof, dimethylpolysiloxane, and methyl hydrogen polysiloxane is further preferred as the organosilicon compounds. In the case of using the organosilane having an alkyl group with 6 carbon atoms at most (hexyl group) in alkyl groups as the organosilane and blending it into a resin or the like, a titanium dioxide pigment having pigment performances such as lower yellowness, lower yellowing degree due to exposure, and higher brightness can be obtained. Also, the titanium dioxide pigment which reduces the amount of volatile moisture and which does not readily decompose when blended into a composition of resin or the like can be obtained. The hydrolysis products of the organosilanes include silanols resulting from hydrolysis of hydrolysable groups of organosilanes, and dimers, oligomers, and polymers resulting from condensation polymerization between silanols.

The organic compound may be singly attached, or the two or more organic compounds may be attached. Specifically, both of polyols and organosilicon compounds may be attached, or different types of organosilicon compounds may be attached in combinations of two or more. The two or more may be attached in form of a mixture or may be separately attached in sequence.

The amount of the organic compound attached is preferably in the range of 0.05 to 5 mass % with regard to titanium dioxide pigment particles. With the amount in the above range, the titanium dioxide pigment can be sufficiently hydrophobized, and thus the desired effects such as high affinity with the resins can be more easily obtained. Furthermore, with the amount in the above range, the bleeding of the organic compound released from a titanium dioxide pigment on the surface of the composition of resin or the like can be avoided. The amount of the organic compound attached is more preferably in the range of 0.1 to 4 mass %. The amount of the organic compound attached can be obtained from the mass change before and after its attachment. Alternatively, the amount of the organic compound attached can be also estimated from the amount of carbon, the amount of nitrogen, the amount of hydrogen, or the like after its attachment.

The present invention also provides a method for manufacturing a titanium dioxide pigment comprising: mixing titanium dioxide particles having an average particle diameter of 0.15 to 1.0 μm, a phosphoric acid compound, and an alkaline earth metal compound; and attaching a compound including the phosphorus and the alkaline earth metal to the titanium dioxide particles.

The same titanium dioxide particles as described above can be used as the titanium dioxide particles. No particular limitation is imposed on the phosphoric acid compound and the alkaline earth metal compound. The examples of the phosphoric acid compound include orthophosphoric acid, metaphosphoric acid, tripolyphosphoric acid, pyrophosphoric acid and the salts thereof. The examples of the alkaline earth metal compound include sulfates, nitrates, chlorides, oxides, and hydroxides of an alkaline earth metal. The phosphates of an alkaline earth metal may be also used.

The mixing/attachment (i.e. mixing and attachment) can be performed in any manner. The examples include the methods for the mixing/attachment (i.e. mixing and attachment) of each raw material described above by means of a dry or wet method. In the case of using the dry method, the both can be performed by the stirring and mixing using the following device: a dry pulverizer such as a fluid energy pulverizer and an impact pulverizer; a high-speed stirrer such as a Henschel mixer and a high-speed mixer; a mixer such as a sample mixer; and a mechanical milling device; or the like. In the case of using the wet method, the raw materials may be dispersed into the slurry, mixed through a wet pulverizer such as a sand mill, a ball mill, a pot mill and a Dyno mill, and then dried. Accordingly, the compound including phosphorus and an alkaline earth metal can be attached to the titanium dioxide particles.

The method for manufacturing a titanium dioxide pigment, which is one embodiment of the present invention comprises: adjusting the pH of an aqueous slurry including titanium dioxide particles, a phosphoric acid compound, and an alkaline earth metal compound; and attaching a compound including the phosphorus and the alkaline earth metal to the titanium dioxide particles. This method is preferred because the compound including phosphorus and an alkaline earth metal can be attached to the titanium dioxide particle surface so as to be relatively flat and uniform. A particularly preferred embodiment is specifically described as follows.

First, an aqueous slurry of the titanium dioxide, which includes the titanium dioxide particles is prepared. The solid content concentration of the titanium dioxide in the aqueous slurry is preferably 50 to 800 g/L, more preferably 100 to 500 g/L. With a solid content concentration in these ranges, the excessive increase in viscosity of the aqueous slurry can be avoided, so that the surfaces of the titanium dioxide particles can be uniformly coated with a material for the coating. Further, the above ranges allow the viscosity of the aqueous slurry to be adequately kept, so that the industrial operability can be maintained. Although the temperature of the aqueous slurry is optional without particular limitation, the yield of the compound including phosphorus and an alkaline earth metal decreases when the slurry temperature is too low. The temperature of the aqueous slurry is preferably 45° C. or higher, more preferably 60° C. or higher.

Then, the compound including phosphorus and an alkaline earth metal is attached to the titanium dioxide particles. The attachment is performed by adding the phosphoric acid compound and the alkaline earth metal compound as the raw materials to the aqueous slurry, and adjusting the pH. The pH causes no problem on an acidic side, but the pH is preferably 7 or higher, more preferably 8.5 to 9.5.

The phosphoric acid compound and the alkaline earth metal compound preferably use the water-soluble compounds among the compounds described above, and are preferably added to the above aqueous slurry in form of the aqueous solution. As the phosphoric acid compound, orthophosphoric acid, sodium hexametaphosphate, and sodium tripolyphosphate are preferred, and as the alkaline earth metal compound, a chloride is preferred. The use of sodium hexametaphosphate as the phosphoric acid compound is preferred because the crystallinity of the compound including phosphorus and an alkaline earth metal when its deposition occurs becomes high, resulting in the high weather resistance of a molded product obtained when kneaded with a resin or the like and processed (i.e. "kneading and processing"). For example, the crystallinity can be confirmed by X-ray diffraction analysis (Ultima IV manufactured by Rigaku Corporation) of the compound including phosphorus and an alkaline earth metal. The full width at half maximum of the main peak observed is $2\theta=2°$ or more.

The sequence of the addition of the phosphoric acid compound and the alkaline earth metal compound to the aqueous slurry is not particularly limited. Although either one may be added at first or both may be added at the same time, preferably the phosphoric acid compound is added at first. The addition rate of each of the phosphate compound and the alkaline earth metal compound is not particularly limited. The whole amounts of both compounds may be added at once, intermittently added in small portions, or continuously added in small portions, and the addition in small portions over a period of about 1 minute to 10 hours is specifically preferred.

For adjustment of the pH, an inorganic basic compound such as sodium hydroxide, potassium hydroxide and ammonia, or an aqueous solution thereof may be used. The rate of addition of the basic compound is not particularly limited. The entire amount may be added at once, or added in small portions, and specifically the addition in small portions over a period of about 1 minute to 10 hours is preferred. After adjustment of the pH, the slurry may be left standing or stirred to be aged. Although the aging time can be appropriately set, this is sufficient in 10 hours or less. During the period from the addition of raw material compounds to the aging, the liquid temperature of the aqueous slurry is preferably kept at 45° C. or higher, more preferably 60° C. or higher.

Accordingly, after the compound including phosphorus and an alkaline earth metal is attached to the titanium dioxide particles, the operations of the filtration/washing and the drying are performed. If needed, the crushing is then performed to obtain the titanium dioxide pigment. With the uses of the above preferred embodiments, the compound including phosphorus and an alkaline earth metal tends to be easily attached to the surfaces of the titanium dioxide particles so as to be more flat and uniform.

Any of the filtration/washing, drying, and crushing can be performed using a well-known device. As the filtering device, a filtering device for general industrial use such as a rotary vacuum filter and a filter press can be used. On that occasion, washing can be performed in parallel. For crushing, a dry pulverizer can be used, and examples of the device include an impact pulverizer, a grinding pulverizer, an air flow pulverizer, and a spray dryer. Among them, an air flow pulverizer is preferred, having excellent pulverizing efficiency. In particular, a swirling-type such as a jet mill is preferred.

The amount which is preferred as the amount of usage of the phosphoric acid compound and the alkaline earth metal compound is appropriately set in consideration of the yield so as to be attached so that the presence amount of them in the pigment becomes 0.05 to 20 mass % according to the calculation described above.

The method for manufacturing a titanium dioxide pigment, which is another embodiment of the present invention comprises attaching the compound including phosphorus and an alkaline earth metal and the inorganic compound including at least one element selected from the group consisting of silicon, aluminum, titanium, tin, zirconium and antimony to the titanium dioxide particles having an average particle diameter of 0.15 to 1.0 µm. As a result, the weather resistance/light resistance of a composition of resin or the like can be further improved. The titanium dioxide pigment having pigment performances such as lower yellowing degree due to exposure and higher brightness can be obtained. Also, the titanium dioxide pigment which reduces the amount of volatile moisture and which does not readily decompose when blended into a composition of resin or the like can be obtained.

In order to attach the above inorganic compound, prior to the attachment of the compound including phosphorus and an alkaline earth metal described above, and/or subsequently to the attachment of the compound including phosphorus and an alkaline earth metal, the following operations can be applied. Specifically, a well-known method (e.g. a method for adding a water-soluble compound of a desired inorganic element and a neutralizing agent to the above aqueous slurry of the titanium dioxide particles simultaneously in parallel, or a method for adding a neutralizing agent after the addition of the water-soluble compound) may be employed. The examples of the water-soluble silicon compound include sodium silicate and potassium silicate, and the examples of the water-soluble aluminum compounds include sodium aluminate, aluminum sulfate, aluminum nitrate and aluminum chloride. The examples of the water-soluble zirconium compound include zirconium sulfate, zirconium nitrate, zirconium chloride and zirconium oxychloride. The examples of the water-soluble titanium compound include titanium tetrachloride and titanium sulfate. The examples of the water-soluble tin compound include stannous chloride, stannic chloride, tin sulfate, tin nitrate, tin acetate and tin oxychloride. The examples of the water-soluble antimony compound include antimony chloride and antimony sulfate. As the neutralizing agent, the well-known agents may be used, including acidic compounds such as inorganic acids such as sulfuric acid and hydrochloric acid and organic acids such as acetic acid and formic acid, and basic compounds such as hydroxides or carbonates of an alkali metal or alkaline earth metal and ammonium compounds. After the above inorganic compound is attached to the titanium dioxide particles in such a manner, the compound including phosphorus and an alkaline earth metal may be directly attached. If needed, the operations of the filtration/washing operation, the drying operation, and then the crushing operation may be performed. Any of the filtration/washing operation, the drying operation, and the crushing operation may be performed using a well-known device.

The sequence of the attachment of the compound including phosphorus and an alkaline earth metal and the above inorganic compound is not particularly limited, and can be appropriately set. For example, after the attachment of the compound including phosphorus and an alkaline earth metal, the above inorganic compound may be attached; after the attachment of the above inorganic compound, the compound including phosphorus and an alkaline earth metal may be attached; or after the attachment of the compound including phosphorus and an alkaline earth metal, the above inorganic compound may be attached and the compound including phosphorus and an alkaline earth metal may be further attached. In the present invention, it is preferable that after the attachment of the above inorganic compound directly on the surface of titanium dioxide particles, the compound including phosphorus and an alkaline earth metal is attached to the outside thereof. This method can reduce the amount of volatile moisture of the titanium dioxide pigment as well as the catalytic activity. As a result, regarding a composition of resin or the like using the pigment, both its heat resistance and its weather resistance/light resistance of a composition of resin or the like are achievable with a good balance at higher levels.

The compound including at least one element selected from the group consisting of silicon, aluminum, titanium, tin, zirconium and antimony, attached to the titanium dioxide particles is preferably at least one selected from the group consisting of each oxide of the above elements, each hydroxide of the above elements, and each hydrous oxide of the above elements.

As the above inorganic compound, the attachment of a dense silicon oxide or hydroxide is preferred. Specifically, a well-known method described in JP 53-33228 A, JP 58-84863 A, or the like may be used. The method described in JP 53-33228 A includes the steps of: while keeping the slurry of titanium dioxide particles at a temperature in the range of 80 to 100° C., preferably adjusting the pH of the slurry in the range of 9 to 10.5, rapidly adding sodium silicate to the slurry, then neutralizing the slurry at a pH in the range of 9 to 10.5; and then maintaining the temperature in the range of 80 to 100° C. for 50 to 60 minutes. The method described in JP 58-84863 A includes the steps of: while keeping the slurry temperature in the range of 60 to 100° C., adding a silicate solution and then slowly adding a mineral acid in order to adjust the pH of the slurry to 8 or more; or while keeping the slurry temperature in the range of 60 to 100° C., adding a silicate solution and a mineral acid at the same time in order to adjust the pH of the slurry to 8 or more. According to the present invention, the dense silicon oxide or hydroxide can be also attached by the following method. Namely, the silicate is neutralized with an acidic compound over a period of 30 minutes so as to form a coating of dense oxide or hydroxide of silicon on the surface of particles. The neutralization is performed more preferably over a period of 1 hour or more. It is preferable that the pH at the neutralization is in the range of 4 to 7.5. Also, it is preferable that the temperature of the aqueous slurry during neutralization is at least 80° C. The reasons are that the dense coating can be easily formed. The neutralization at the pH in the range of 4.5 to 7 is more preferable. Also, the neutralization temperature of 90° C. or higher is more preferable.

Also, in the method for manufacturing a titanium dioxide pigment according to the present invention, the titanium dioxide pigment obtained by the manufacturing method described above may be further fired. Such a firing treatment of the titanium dioxide pigment after performing the surface treatment according to the present invention enables the amount of volatile moisture to be further reduced with the high brightness being maintained. As a result, the pigment obtained thereby is preferable as a white pigment used in a composition of resin or the like which requires a heat-resistance. However, this method has a disadvantage of high manufacturing cost. Thus, this method is preferably used to manufacture a titanium dioxide pigment used in the field such as an engineering plastic resin composition which requires the processing at a particularly high temperature, or a titanium dioxide pigment which has a large surface presence amount of the compound including phosphorus and an alkaline earth metal and the above inorganic compound on the surface of the titanium dioxide pigment. This method is preferably used in the case of the total surface presence amount of more than 1 mass %, in particular, preferably in the case of more than 2 mass %, still more preferably in the case of more than 4 mass %

The firing temperature is preferably in the range of 300 to 1000° C. In the case of a temperature lower than the above range, the crystallization water hardly desorbs. Thus, the advantage of this treatment is reduced. In the case of a temperature higher than the above range, the sintering proceeds, so that the titanium dioxide particles strongly aggregate each other. The range of firing temperature is more preferably 350 to 800° C. The firing time may be appropriately set according to the amount of the water desorption, but is not particularly limited. As for the firing, a well-known heating device such as an electric furnace, a rotary kiln, a tunnel kiln, or the like may be used. The heating atmosphere may be optionally selected from the group consisting of an oxidizing atmosphere, a reducing atmosphere, an inert atmosphere, and the like, and the firing may be performed in air. If needed, the fired product obtained may be pulverized. The pulverization may be performed using a well-known pulverizer described above.

Also, in the method for manufacturing a titanium dioxide pigment according to the present invention, the organic compound may be further attached to the titanium dioxide pigment obtained by the manufacturing method described above. The specific examples include: (1) a method for feeding an organic compound into a dry pulverizer, when the titanium dioxide pigment obtained is pulverized by the dry pulverizer such as a fluid energy pulverizer and an impact pulverizer; (2) a method for stirring and mixing the titanium dioxide pigment and the organic compound using a high-speed stirrer or the like such as a Henschel mixer and a super mixer after dry pulverization; and (3) a method for adding the organic compound into the aqueous slurry to be stirred after the surface treatment. Particularly, in method (1) described above, the pulverization of the titanium dioxide and the treatment with the organic compound can be performed at the same time, so that the manufacturing process is reasonable and preferable industrially. As the dry pulverizer, a fluid energy pulverizer is preferred, which has excellent pulverizing efficiency and mixing properties, and a swirling-type such as jet mill, in particular, is more preferred. The examples of the organic compound include the organic compounds described above.

The organic compound may be singly attached, or the two or more organic compounds may be attached. Specifically, for example, polyols and organosilicon compounds may be treated to form a composite thereof, or different types of organosilicon compounds may be treated in combination.

Furthermore, the present invention relates to a composition of coating material, ink, resin or the like, which includes the titanium dioxide pigment described above. In the composition of coating material or the composition of ink, an optional amount of the titanium dioxide pigment is blended into a conventional solvent, a binder, and various additives, and the like. The examples of the resin used in the resin composition of the present invention include the following, but are not particularly limited. Further, in order to improve the properties such as impact resistance, scratch resistance, chemical resistance, and fluidity, the two or more of the following resins can be used in combination.

The examples of the thermoplastic resin include:
(1) General-purpose plastic resin (e.g. (a) polyolefin resin (polyethylene, polypropylene, and the like), (b) polyvinyl chloride resin, (c) acrylonitrile butadiene styrene resin, (d) polystyrene resin, (e) methacrylic resin, and (0 polyvinylidene chloride resin);
(2) Engineering plastic resin (e.g. (a) polycarbonate resin, (b) polyethylene terephthalate resin, (c) polyamide resin, (d) polyacetal resin, (e) modified polyphenylene ether, and (0 fluororesin);
(3) Super engineering plastic resin (e.g. (a) polyphenylene sulfide resin (PPS), (b) polysulfone resin (PSF), (c) polyether sulfone resin (PES), (d) amorphous polyarylate resin (PAR), (e) liquid crystal polymer (LCP), (0 polyether ether ketone resin (PEEK), (g) polyamide imide resin (PAI), and (h) polyether imide resin (PEI)).

The examples of the thermosetting resin include:
(a) epoxy resin, (b) phenolic resin, (c) unsaturated polyester resin, (d) polyurethane resin, (e) melamine resin, and (f) silicone resin.

In the case of applying the titanium dioxide pigment of the present invention to the general-purpose plastic resin composition, the resin composition has high heat resistance without surface defects such as lacing, pinholes and the like, and further has excellent light resistance/weather resistance. The resin composition is, therefore, useful in molded products such as convenience goods, films, mechanical parts, electric/electronic parts, building components, and medical instruments. The present invention can be applicable to not only such molded products, but also to intermediate products such as master batches and color pellets. The application to master batches is particularly useful because of hardly causing surface defects even with a high pigment concentration.

In the case of using the titanium dioxide pigment of the present invention in an engineering plastic resin composition or in a super engineering plastic resin composition, the resin composition is almost free from processing defects such as silver streaks, has excellent physical properties such as strength, and gives high heat resistance. The resin composition is, therefore, useful in molded products such as mechanical parts, parts and housings of electric/electronic equipment, medical equipment, optical parts, packaging materials, prepaid cards, and automobile components. The present invention can be applicable to not only such molded products, but also to intermediate products such as master batches and color pellets. The application to master batches is particularly useful because of having excellent silver streak resistance even with a high pigment concentration.

Since the titanium dioxide pigment of the present invention has a high brightness, the use in a rein composition for a light reflective material provides a resin excellent in reflectivity. Specifically, the reflective material can be applied to, for example, a reflective material of the backlight device and lamp reflector for image displaying of a liquid crystal display and the like, a reflective material for lighting equipment, a back-side reflective material of an illuminated signboard, and a back-side reflective material of solar cells. The use as the reflective material of an LED light emitting device is particularly suitable.

The blending ratio of the titanium dioxide pigment to the plastic resin is not particularly limited, but is usually in the range of 1 to 80 parts by weight, more preferably in the range of 1 to 60 parts by weight, of the titanium dioxide pigment, with regard to 100 parts by weight of 100 the plastic resin, but is not particularly limited. The ratio for a master batch is in the range of 10 to 900 parts by weight, more preferably in the range of 50 to 500 parts by weight. Furthermore, various additives known to a skilled person including reinforcing materials such as glass fiber, stabilizing agents, dispersing agents, lubricants, antioxidants, ultraviolet absorbers, and filler may be added depending on the intended use.

These resin compositions can be obtained by blending the titanium dioxide pigment into a molten resin using a kneader. Any kneader in general use can be used as the kneader, and examples thereof include an intensive mixer such as a single screw extruders, a twin screw extruder, and a Banbury mixer, and a roll forming machine. Depending on each of the characteristics and intended use, the compositions are molded into sheets, films, laminates, cast products, or the like, for use in various fields.

EXAMPLES

The present invention is described in more detail with reference to Examples as follows. The following examples are given for illustrative purpose only, and the scope of the present invention is not limited thereto.

Example 1

Using a wet pulverizer, 1000 g of titanium dioxide particles (manufactured by Ishihara Sangyo Kaisha, Ltd., rutile-type, average particle diameter: 0.20 μm) were dispersed in deionized water to prepare an aqueous slurry of titanium dioxide with a solid content concentration of 330 g/L, which was then warmed to a temperature of 80° C.

Subsequently, sodium hexametaphosphate in an amount of 1 mass % in terms of calcium hexametaphosphate relative to the titanium dioxide particles was dissolved in 0.1 liters of deionized water to prepare an aqueous solution, which was then added to the aqueous slurry over a period of 10 minutes. Subsequently, a predetermined amount of calcium chloride was dissolved in 0.1 liters of deionized water to prepare an aqueous solution, which was added to the aqueous slurry over a period of 10 minutes. Subsequently, an aqueous solution of sodium hydroxide was added to the aqueous slurry over a period of 10 minutes, so that the pH of the aqueous slurry was adjusted in the range from 8.5 to 9.5. Then, with the liquid temperature of the aqueous slurry maintained at 80° C., the slurry was stirred for 60 minutes to be aged. The compound including phosphorus and an alkaline earth metal was thus attached to the titanium dioxide particles.

Then, using a Buchner funnel, the particles were filtered and washed with deionized water until the specific resistance of the filtrate reached 8000 Ωcm or higher, and then dried at 120° C. for 15 hours. The dried product was pulverized by an air flow pulverizer, so that a titanium dioxide pigment (Sample A) was obtained.

Examples 2 to 6

Except that in Example 1, the amount in terms of calcium hexametaphosphate was changed to 2 mass %, 3 mass %, 4 mass %, 5 mass %, and 6 mass %, respectively, a titanium dioxide pigment (Sample B, C, D, E, and F, respectively) was obtained in the same manner as Example 1.

Example 7

Except that in Example 4, titanium dioxide particles (manufactured by Ishihara Sangyo Kaisha, Ltd., rutile-type, average particle diameter: 0.25 μm) were used, particles pulverized by an air flow pulverizer were obtained in the same manner as Example 4. The pulverized powder was then fired at a temperature of 350° C. for 1 hour, so that a titanium dioxide pigment (Sample G) was obtained.

Example 8

Except that in Example 7, the firing temperature was changed to 700° C., a titanium dioxide pigment (Sample H) was obtained in the same manner as Example 7.

Example 9

Except that in Example 1, sodium tripolyphosphate in an amount of 4 mass % in terms of calcium tripolyphosphate relative to the titanium dioxide particles was dissolved in 0.1 liters of deionized water to prepare an aqueous solution, which was then added to the aqueous slurry over a period of 10 minutes, and subsequently, a predetermined amount of calcium chloride was dissolved in 0.1 liters of deionized water to prepare an aqueous solution, which was added to the aqueous slurry over a period of 10 minutes, a titanium dioxide pigment (Sample I) was obtained in the same manner as Example 1.

Example 10

Using a wet pulverizer, 1000 g of titanium dioxide particles (manufactured by Ishihara Sangyo Kaisha, Ltd., rutile-type, average particle diameter: 0.25 μm) were dispersed in deionized water to prepare an aqueous slurry of titanium dioxide with a solid content concentration of 300 g/L, which was then warmed to a temperature of 80° C.

Subsequently, sodium tripolyphosphate in an amount of 4 mass % in terms of calcium tripolyphosphate relative to the titanium dioxide particles was dissolved in 0.5 liters of deionized water to prepare an aqueous solution, which was then added to the aqueous slurry over a period of 10 minutes. Subsequently, a predetermined amount of calcium chloride was dissolved in 0.2 liters of deionized water to prepare an aqueous solution, which was added to the aqueous slurry over a period of 60 minutes. Subsequently, an aqueous solution of sodium hydroxide was added to the aqueous slurry over a period of 60 minutes, so that the pH of the aqueous slurry was adjusted in the range from 8.5 to 9.5. The compound including phosphorus and an alkaline earth metal was thus attached to the titanium dioxide particles.

Then, using a Buchner funnel, the particles were filtered and washed with deionized water until the specific resistance of the filtrate reached 8000 Ωcm or higher, and then dried at 120° C. for 15 hours. The dried product was pulverized by an air flow pulverizer, so that a titanium dioxide pigment (Sample J) was obtained. When the value calculated from (weight of dry sample discharged from air flow pulverizer/weight of dry sample fed into air flow pulverizer)×100 is defined as "recovery percentage", the titanium dioxide particles in Example 10 had a recovery percentage of 89%.

Example 11

Using a wet pulverizer, 1000 g of titanium dioxide particles (manufactured by Ishihara Sangyo Kaisha, Ltd., rutile-type, average particle diameter: 0.25 μm) were dispersed in deionized water to prepare an aqueous slurry of titanium dioxide with a solid content concentration of 330 g/L, which was then warmed to a temperature of 80° C.

Subsequently, orthophosphoric acid in an amount of 4 mass % in terms of calcium orthophosphate relative to the titanium dioxide particles was dissolved in 0.1 liters of deionized water to prepare an aqueous solution, which was then added to the aqueous slurry over a period of 10 minutes. Subsequently, a predetermined amount of calcium chloride was dissolved in 0.1 liters of deionized water to prepare an aqueous solution, which was added to the aqueous slurry over a period of 10 minutes. Subsequently, an aqueous solution of sodium hydroxide was added to the aqueous slurry over a period of 10 minutes, so that the pH of the aqueous slurry was adjusted in the range from 8.5 to 9.5. Then, with the liquid temperature of the aqueous slurry maintained at 80° C., the slurry was stirred for 60 minutes to be aged. The compound including phosphorus and an alkaline earth metal was thus attached to the titanium dioxide particles.

Then, using a Buchner funnel, the particles were filtered and washed with deionized water until the specific resistance of the filtrate reached 8000 Ωcm or higher, and then dried at 120° C. for 15 hours. The dried product was pulverized by an air flow pulverizer, so that a titanium dioxide pigment (Sample K) was obtained.

Examples 12 and 13

The titanium dioxide pigment K obtained in Example 11 was fired at a temperature of 350° C. and 700° C., respectively, for 1 hour, so that a titanium dioxide pigment (Sample L and M, respectively) was obtained.

Example 14

Except that in Example 11, orthophosphoric acid in an amount of 4 mass % in terms of magnesium orthophosphate relative to the titanium dioxide particles was dissolved in 0.1 liters of deionized water to prepare an aqueous solution, which was then added to the aqueous slurry over a period of 10 minutes, and subsequently, a predetermined amount of magnesium chloride was dissolved in 0.1 liters of deionized water to prepare an aqueous solution, which was added to the aqueous slurry over a period of 10 minutes, pulverized powder was obtained in the same manner as Example 11. Subsequently, the pulverized powder obtained was fired at a temperature of 350° C. for 1 hour, so that a titanium dioxide pigment (Sample N) was obtained.

Example 15

Except that in Example 14, the firing temperature was changed to 700° C., a titanium dioxide pigment (Sample 0) was obtained in the same manner as Example 14.

Example 16

Except that in Example 11, sodium hexametaphosphate in an amount of 4 mass % in terms of magnesium hexametaphosphate relative to the titanium dioxide particles was dissolved in 0.1 liters of deionized water to prepare an aqueous solution, which was then added to the aqueous slurry over a period of 10 minutes, and subsequently, a predetermined amount of magnesium chloride was dissolved in 0.1 liters of deionized water to prepare an aqueous solution, which was added to the aqueous slurry over a period of 10 minutes, pulverized powder was obtained in the same manner as Example 11. Subsequently, the pulverized powder obtained was fired at a temperature of 350° C. for 1 hour, so that a titanium dioxide pigment (Sample P) was obtained.

Example 17

Except that in Example 16, the firing temperature was changed to 700° C., a titanium dioxide pigment (Sample Q) was obtained in the same manner as Example 16.

Example 18

Using a wet pulverizer, 1000 g of titanium dioxide particles (manufactured by Ishihara Sangyo Kaisha, Ltd., rutile-type, average particle diameter: 0.20 μm) were dispersed in deionized water to prepare an aqueous slurry of titanium dioxide with a solid content concentration of 30 g/L, which was then warmed to a temperature of 80° C.

Subsequently, while maintaining the temperature, an aqueous solution of sodium silicate in an amount equivalent to 0.5 mass % in terms of $SiO_2$ was added to the titanium dioxide particles, and then sulfuric acid (1 N) was added over a period of 60 minutes so that the pH was adjusted to about 5. Subsequently, the mixture was stirred for 60 minutes to be aged, so that a coating layer of dense hydrous silica was formed. Subsequently, washing and solid-liquid separation were performed with a suction filter.

Subsequently, the cake obtained was repulped to make an aqueous slurry in the same manner as Example 4. The slurry was then treated in the same manner as Example 4, so that a titanium dioxide pigment (Sample R) was obtained.

Examples 19 and 20

Except that in Example 18, the amount of the aqueous solution of sodium silicate added was changed to 1.0 mass % and 2.0 mass %, respectively in terms of $SiO_2$, a titanium dioxide pigment (Sample S and T, respectively) was obtained in the same manner as Example 18.

Example 21

Except that in Example 18, the amount of the aqueous solution of sodium silicate added was changed to 4.0 mass % in terms of $SiO_2$, and titanium dioxide particles (manufactured by Ishihara Sangyo Kaisha, Ltd., rutile-type, average particle diameter: 0.25 μm) were used, a titanium dioxide pigment (Sample U) was obtained in the same manner as Example 18.

Example 22

In Example 10, after the compound including phosphorus and an alkaline earth metal was attached to the titanium dioxide particles, an aqueous solution of sodium silicate in an amount equivalent to 0.5 mass % in terms of $SiO_2$ was added to the titanium dioxide particles. On this occasion, sulfuric acid was added, so that the pH of the aqueous slurry was adjusted in the range from 6.5 to 7.0. The compound including phosphorus and an alkaline earth metal was thus attached to the titanium dioxide particles as the inner layer and the porous $SiO_2$ was thus attached as the outer layer.

Then, using a Buchner funnel, the particles were filtered and washed with deionized water until the specific resistance of the filtrate reached 8000 Ωcm or higher, and then dried at 120° C. for 15 hours. The dried product was pulverized by an air flow pulverizer, so that a titanium dioxide pigment (Sample V) was obtained. In Example 22, the "recovery percentage" of the titanium dioxide particles was 97% as described above.

Example 23

In Example 10, after the compound including phosphorus and an alkaline earth metal was attached to the titanium dioxide particles, an aqueous solution of zirconium sulfate in an amount equivalent to 0.6 mass % in terms of $ZrO_2$ was added to the titanium dioxide particles. On this occasion, sodium hydroxide was added, so that the pH of the aqueous slurry was adjusted in the range from 6.5 to 7.0. The compound including phosphorus and an alkaline earth metal was thus attached to the titanium dioxide particles as the inner layer and the $ZrO_2$ was thus attached as the outer layer.

Then, using a Buchner funnel, the particles were filtered and washed with deionized water until the specific resistance of the filtrate reached 8000 Ωcm or higher, and then dried at 120° C. for 15 hours. The dried product was pulverized by an air flow pulverizer, so that a titanium dioxide pigment (Sample W) was obtained. In Example 23, the "recovery percentage" of the titanium dioxide particles was 89% as described above.

Example 24

In Example 10, after the compound including phosphorus and an alkaline earth metal was attached to the titanium dioxide particles, an aqueous solution of sodium aluminate in an amount equivalent to 0.8 mass % in terms of $Al_2O_3$ was added to the titanium dioxide particles. On this occasion, sulfuric acid was added, so that the pH of the aqueous slurry was adjusted in the range from 6.5 to 7.0. The compound including phosphorus and an alkaline earth metal was thus attached to the titanium dioxide particles as the inner layer and the $Al_2O_3$ was thus attached as the outer layer.

Then, using a Buchner funnel, the particles were filtered and washed with deionized water until the specific resistance of the filtrate reached 8000 Ωcm or higher, and then dried at 120° C. for 15 hours. The dried product was pulverized by an air flow pulverizer, so that a titanium dioxide pigment (Sample X) was obtained. In Example 24, the "recovery percentage" of the titanium dioxide particles was 88% as described above.

Examples 25 to 32

Each of the titanium dioxide pigments obtained in Examples 2 to 7, 20 and 21 (Samples B to G, T and U, respectively) and 1.5 mass % of methyl hydrogen polysiloxane (manufactured by Dow Corning Toray Co., Ltd.) were mixed using a Henschel mixer, so that a titanium dioxide pigment (Samples Y to AD, AE and AF, respectively) was obtained.

Comparative Example 1

Except that in Example 1, sodium hexametaphosphate in an amount of 4 mass % in terms of aluminum hexametaphosphate relative to the titanium dioxide particles was dissolved in 0.1 liters of deionized water to prepare an aqueous solution, which was then added to the aqueous slurry over a period of 10 minutes, and subsequently, a predetermined amount of sodium aluminate was dissolved in 0.1 liters of deionized water to prepare an aqueous solution, which was added to the aqueous slurry over a period of 10 minutes, Comparative Sample a was obtained in the same manner as Example 1.

Comparative Example 2

Titanium dioxide particles (manufactured by Ishihara Sangyo Kaisha, Ltd., rutile-type, CR-60, average particle diameter: 0.20 μm) were pulverized with an air flow pulverizer, so that Comparative Sample b was obtained.

Comparative Example 3

Comparative Sample b obtained in Comparative Examples 2 and 1.5 mass % of methyl hydrogen polysiloxane (manufactured by Dow Corning Toray Co., Ltd.) were mixed using a Henschel mixer, so that Comparative Sample c was obtained.

The components of the titanium dioxide pigments obtained in Examples and Comparative Examples such as phosphorus and alkaline earth metals were analyzed by X-ray fluorescence analysis or ICP emission spectroscopy.

The results are shown in Table 1. It was found that the amount attached by a compound including phosphorus and an alkaline earth metal is preferably in the range of 0.05 to 20 mass %, with R($P_2O_5$/MO) in the range of 0.5 to 2.0. The electron microscopic observation showed that the surface of the titanium dioxide particles was coated with a compound including phosphorus and an alkaline earth metal in the samples in Examples 1 to 17 and 25 to 30. In the samples in Examples 18 to 21, 31 and 32, the coating of silica was further coated with a compound including phosphorus and alkaline earth metal. In the sample in Example 22, the coating of a compound including phosphorus and an alkaline earth metal was further coated with silica. In the sample in Example 23, the coating of a compound including phosphorus and an alkaline earth metal was further coated with zirconia. In the sample in Example 24, the coating of the compound including phosphorus and an alkaline earth metal was further coated with alumina. Incidentally, the silica component derived from methyl hydrogen polysiloxane is not described in Table 1. The analytical values of phosphorus divalent alkaline earth metal oxides (MO), and various inorganic compounds shown in Table 1 are slightly different from the amount of phosphorus, MO, and inorganic compounds added described in the various Examples. It is conceivable that all of the inorganic compounds and the like added in various Examples are not necessarily attached to the titanium dioxide particles (In other words, some are not attached to the titanium dioxide particles).

TABLE 1

| | Sample | Analytical value of phosphorus (mass %) $P_2O_5$ | Analytical value of MO (mass %) CaO | MgO | Inorganic compound (mass %) $Al_2O_3$ | $SiO_2$ | $ZrO_2$ | R $P_2O_5$/MO | Total treatment amount of surface of titanium dioxide pigment by inorganic compound(s) (mass %) |
|---|---|---|---|---|---|---|---|---|---|
| Example 1 | A | 0.53 | 0.62 | — | — | — | — | 0.85 | 1.15 |
| Example 2 | B | 0.96 | 1.08 | — | — | — | — | 0.89 | 2.04 |
| Example 3 | C | 1.37 | 1.50 | — | — | — | — | 0.91 | 2.87 |
| Example 4 | D | 1.79 | 1.90 | — | — | — | — | 0.94 | 3.69 |
| Example 5 | E | 2.17 | 2.28 | — | — | — | — | 0.95 | 4.45 |
| Example 6 | F | 2.56 | 2.68 | — | — | — | — | 0.96 | 5.24 |
| Example 7 | G | 1.79 | 1.90 | — | — | — | — | 0.94 | 3.69 |
| Example 8 | H | 1.79 | 1.90 | — | — | — | — | 0.94 | 3.69 |
| Example 9 | I | 2.14 | 1.95 | — | — | — | — | 1.10 | 4.09 |
| Example 10 | J | 2.14 | 1.95 | — | — | — | — | 1.10 | 4.09 |
| Example 11 | K | 1.50 | 2.13 | — | — | — | — | 0.70 | 3.63 |
| Example 12 | L | 1.50 | 2.13 | — | — | — | — | 0.70 | 3.63 |
| Example 13 | M | 1.50 | 2.13 | — | — | — | — | 0.70 | 3.63 |
| Example 14 | N | 1.57 | — | 1.67 | — | — | — | 0.94 | 3.24 |
| Example 15 | O | 1.57 | — | 1.67 | — | — | — | 0.94 | 3.24 |
| Example 16 | P | 1.91 | — | 1.45 | — | — | — | 1.32 | 3.36 |
| Example 17 | Q | 1.91 | — | 1.45 | — | — | — | 1.32 | 3.36 |
| Example 18 | R | 1.75 | 2.03 | — | — | 0.50 | — | 0.86 | 4.28 |
| Example 19 | S | 1.74 | 2.05 | — | — | 0.95 | — | 0.85 | 4.74 |
| Example 20 | T | 1.71 | 2.04 | — | — | 1.87 | — | 0.84 | 5.62 |
| Example 21 | U | 1.67 | 2.02 | — | — | 3.74 | — | 0.83 | 7.43 |
| Example 22 | V | 2.14 | 1.95 | — | — | 0.50 | — | 1.10 | 4.59 |
| Example 23 | W | 1.24 | 0.87 | — | — | — | 0.61 | 1.43 | 2.72 |
| Example 24 | X | 1.29 | 0.72 | — | 0.77 | — | — | 1.79 | 2.78 |
| Example 25 | Y | 0.96 | 1.08 | — | — | — | — | 0.89 | 2.04 |
| Example 26 | Z | 1.37 | 1.50 | — | — | — | — | 0.91 | 2.87 |
| Example 27 | AA | 1.79 | 1.90 | — | — | — | — | 0.94 | 3.69 |
| Example 28 | AB | 2.17 | 2.28 | — | — | — | — | 0.95 | 4.45 |
| Example 29 | AC | 2.56 | 2.68 | — | — | — | — | 0.96 | 5.24 |
| Example 30 | AD | 1.79 | 1.90 | — | — | — | — | 0.94 | 3.69 |
| Example 31 | AE | 1.71 | 2.04 | — | — | 1.87 | — | 0.84 | 5.62 |
| Example 32 | AF | 1.67 | 2.02 | — | — | 3.74 | — | 0.83 | 7.43 |
| Comparative Example 1 | a | 2.08 | — | — | 1.98 | — | — | — | 4.06 |
| Comparative Example 2 | b | — | — | — | 0.53 | — | — | — | 0.53 |
| Comparative Example 3 | c | — | — | — | 0.53 | — | — | — | 0.53 |

The specific surface area (SSA), the BET diameter, and the median diameter of the titanium dioxide pigments obtained in Examples and Comparative Examples were measured to calculate the BET diameter/median diameter. The BET specific surface area was measured by a nitrogen gas adsorption-desorption method (MacSorb HM model-1220, manufactured by Mountech Co., Ltd.), and the median diameter was measured as median diameter of the volume-based particle size distribution measured by laser diffraction particle size distribution analyzer (LA-950 manufactured by Horiba, Ltd.). The results are shown in Table 2. The value of BET diameter/median diameter is preferably in the range of 0.04 to 1.0, more preferably in the range of 0.3 to 0.8. It was found that the samples in Examples meet the range of 0.04 to 1.0.

TABLE 2

| Sample | | SSA (m²/g) | BET diameter (μm) | Median diameter (μm) | BET diameter/Median diameter |
|---|---|---|---|---|---|
| Example 1 | A | 8.4 | 0.17 | 0.31 | 0.55 |
| Example 2 | B | 8.3 | 0.17 | 0.31 | 0.55 |
| Example 3 | C | 8.5 | 0.17 | 0.31 | 0.55 |
| Example 4 | D | 8.3 | 0.17 | 0.33 | 0.52 |
| Example 5 | E | 8.4 | 0.17 | 0.34 | 0.50 |
| Example 6 | F | 8.5 | 0.17 | 0.36 | 0.47 |
| Example 7 | G | 6.2 | 0.23 | 0.55 | 0.42 |
| Example 8 | H | 6.0 | 0.24 | 0.67 | 0.36 |
| Example 9 | I | 7.7 | 0.18 | 0.38 | 0.47 |
| Example 10 | J | 8.7 | 0.16 | 0.56 | 0.29 |
| Example 11 | K | 7.9 | 0.18 | 0.45 | 0.40 |
| Example 12 | L | 8.1 | 0.17 | 0.41 | 0.41 |
| Example 13 | M | 7.8 | 0.18 | 0.51 | 0.35 |
| Example 14 | N | 7.1 | 0.20 | 0.41 | 0.49 |
| Example 15 | O | 6.3 | 0.22 | 0.48 | 0.46 |
| Example 16 | P | 6.6 | 0.21 | 0.42 | 0.50 |
| Example 17 | Q | 6.9 | 0.20 | 0.43 | 0.47 |
| Example 18 | R | 8.3 | 0.17 | 0.51 | 0.33 |
| Example 19 | S | 9.6 | 0.15 | 0.55 | 0.27 |
| Example 20 | T | 10.8 | 0.13 | 0.56 | 0.23 |
| Example 21 | U | 9.7 | 0.14 | 3.26 | 0.04 |
| Example 22 | V | 9.2 | 0.15 | 0.60 | 0.25 |
| Example 23 | W | 8.9 | 0.16 | 0.39 | 0.41 |
| Example 24 | X | 8.4 | 0.17 | 0.39 | 0.44 |
| Example 25 | Y | 6.4 | — | — | — |
| Example 26 | Z | 6.6 | — | — | — |
| Example 27 | AA | 6.6 | — | — | — |
| Example 28 | AB | 6.7 | — | — | — |
| Example 29 | AC | 6.7 | — | — | — |
| Comparative Example 1 | a | 8.4 | 0.17 | 0.39 | 0.44 |
| Comparative Example 2 | b | 7.0 | 0.20 | 0.38 | 0.53 |
| Comparative Example 3 | c | 5.3 | — | — | — |

[Powder Color (in the Hunter Color System) Test]

An aluminum ring having a diameter of 30 mm was filled with 2.0 g of the sample obtained in each of Examples and Comparative Examples, which was compressed under a pressure of 10 MPa by a pressing machine. The Hunter color system (L, a and b) of the sample was then measured by a color computer (SM-5 manufactured by Suga Test Instruments Co., Ltd). The color difference Δb in the b-value between the presence and the absence of a compound including phosphorus and an alkaline earth metal was calculated through the comparison between Examples and Comparative Examples. The results are shown in Table 3. It was found that the titanium dioxide pigment of the present invention can be used as a white pigment, having an L-value of 95 or more, and a b-value of 1.0 to 2.0. It was also found that the titanium dioxide pigment of the present invention has a small b-value, having low yellowness, with a color difference Δb in yellowness from a Comparison Sample of −0.1 or less.

TABLE 3

| | | Powder color | | | Powder color Δ b (Each Sample-Comparative |
|---|---|---|---|---|---|
| Sample | | L | a | b | Sample b) |
| Example 1 | A | 101.1 | −0.6 | 1.4 | −0.9 |
| Example 2 | B | 101.2 | −0.6 | 1.5 | −0.8 |
| Example 3 | C | 101.3 | −0.6 | 1.3 | −1.0 |
| Example 4 | D | 101.3 | −0.5 | 1.2 | −1.1 |
| Example 5 | E | 101.4 | −0.6 | 1.2 | −1.1 |
| Example 6 | F | 101.4 | −0.6 | 1.2 | −1.1 |
| Example 10 | J | 97.6 | −0.2 | 1.8 | −0.5 |
| Example 22 | V | 97.8 | −0.3 | 1.8 | −0.5 |
| Example 23 | W | 99.2 | −0.7 | 1.5 | −0.8 |
| Example 24 | X | 99.7 | −0.7 | 1.6 | −0.7 |
| Comparative Example 2 | b | 100.8 | −0.7 | 2.3 | — |

<Yellowing Degree Test>

A sample obtained in each of Examples and Comparative Examples in amount of 25.0 g, 500 g of a polyethylene resin (HI-ZEX 5000S, manufactured by Prime Polymer Co., Ltd.), 1 g of a phenolic antioxidant (BHT), and 0.5 g of HALS (Sanol LS-770, manufactured by Sankyo Co., Ltd.) were mixed. The mixture was melted and extruded at a preset resin temperature of 250° C., with a twin screw extruder by PCM-30 (manufactured by Ikegai Corporation) to form into a sheet having a thickness of 0.8 mm, using a haul-off unit.

The sheet was exposed to black light for 21 days. The tristimulus values before and after exposure were measured in accordance with JIS K7373, using a color computer SM-5 manufactured by Suga Test Instruments Co., Ltd., so that the yellowing degree (ΔYI) was calculated. The results are shown in Table 4. It was found that Samples in Examples had a low yellowing degree in comparison with Comparative Samples.

TABLE 4

| Sample | | Yellowing degree (ΔYI) |
|---|---|---|
| Example 1 | A | 1.25 |
| Example 2 | B | 0.48 |
| Example 3 | C | 0.13 |
| Example 4 | D | 0.04 |
| Example 5 | E | 0.06 |
| Example 6 | F | 0.10 |
| Example 16 | P | 1.97 |
| Example 18 | R | 0.98 |
| Example 19 | S | 0.99 |
| Example 20 | T | 0.96 |
| Comparative Example 2 | b | 6.07 |

From the evaluation results, it was found that a titanium dioxide pigment comprising 0.05 to 20 mass % of a compound including phosphorus and an alkaline earth metal present on the surface of titanium dioxide particles having an average particle diameter of 0.15 to 1.0 μm has a lower yellowness than a titanium dioxide pigment without the presence of phosphorus and an alkaline earth metal, with the yellowing degree due to exposure being much improved.

From the Karl Fischer moistures of each sample obtained in Examples and Comparative Examples measured at 100° C. and 300° C., the value divided by the total amount (mass %) of the inorganic compound(s) present on a surface of the same sample, the amount being used to treat the surface was calculated. The results are shown in Table 5. The samples of the present invention have a low value of ΔKF (ppm)/a total treatment amount (mass %) of the surface of the titanium dioxide pigment by an inorganic compound(s). The value is preferably 3500 or less, more preferably 1000 or less, still more preferably in the range of 500 or less. It was found that the samples in Examples meet the range of 3500 or less. Furthermore, the ΔKF (ppm) of each of the samples of the present invention was also low. The value is preferably 3500 ppm or less, more preferably 2500 ppm or less, still more preferably in the range of 1500 ppm or less. It was found that the samples in Examples meet the range of 3500 ppm or less.

TABLE 5

|  | Sample | KF moisture (ppm) 100° C. | KF moisture (ppm) 300° C. | Δ KF | Δ KF moisture/total treatment amount of surface of titanium dioxide pigment by inorganic compound(s) (ppm/mass %) |
|---|---|---|---|---|---|
| Example 1 | A | 3303 | 4244 | 941 | 818 |
| Example 2 | B | 4157 | 5417 | 1260 | 618 |
| Example 3 | C | 4408 | 5002 | 594 | 207 |
| Example 4 | D | 4691 | 6512 | 1821 | 493 |
| Example 5 | E | 4519 | 7524 | 3005 | 675 |
| Example 6 | F | 4286 | 7606 | 3320 | 634 |
| Example 7 | G | 3776 | 4513 | 737 | 200 |
| Example 8 | H | 2877 | 3964 | 1087 | 295 |
| Example 9 | I | 4610 | 7784 | 3174 | 776 |
| Example 10 | J | 3053 | 6256 | 3203 | 780 |
| Example 11 | K | 4360 | 6698 | 2338 | 644 |
| Example 12 | L | 4806 | 6128 | 1322 | 364 |
| Example 13 | M | 2709 | 4068 | 1359 | 374 |
| Example 14 | N | 7106 | 8874 | 1768 | 546 |
| Example 15 | O | 3409 | 4524 | 1115 | 344 |
| Example 16 | P | 7530 | 8982 | 1452 | 432 |
| Example 17 | Q | 5081 | 6418 | 1337 | 398 |
| Example 18 | R | 5095 | 6826 | 1731 | 404 |
| Example 19 | S | 4501 | 7419 | 2918 | 616 |
| Example 20 | T | 4777 | 8191 | 3414 | 607 |
| Example 21 | U | 6118 | 7305 | 1187 | 160 |
| Example 22 | V | 5247 | 7719 | 2472 | 539 |
| Example 23 | W | 4408 | 6052 | 1644 | 604 |
| Example 24 | X | 4975 | 7573 | 2598 | 934 |
| Example 25 | Y | 2137 | 3165 | 1028 | 504 |
| Example 26 | Z | 2115 | 4477 | 2362 | 823 |
| Example 27 | AA | 2159 | 5043 | 2884 | 782 |
| Example 28 | AB | 2323 | 4806 | 2483 | 558 |
| Example 29 | AC | 2268 | 4749 | 2481 | 473 |
| Comparative Example 1 | a | 9945 | 14306 | 4361 | 1074 |

The MFR (MELT INDEXER L202, manufactured by Takara Co., Ltd.) of the samples obtained in Examples and Comparative Example was measured. A polycarbonate resin (TARFLON FN2200A, manufactured by Idemitsu Kosan Co., Ltd.) in amount of 400.0 g and 40.0 g of a sample were kneaded with a twin screw extruder PCM-30 (Ikegai Co., Ltd.) to form into a sheet. The melt flow rate (MFR) of each of the sheets was calculated based on a melt indexer test method. The results are shown in Table 6. It was found that the samples treated with methyl hydrogen polysiloxane in Examples had a particularly low MFR value, with the decomposition being more effectively suppressed when blended into a resin.

TABLE 6

|  | Sample | MFR |
|---|---|---|
| Example 1 | A | 75.4 |
| Example 4 | D | 31.7 |
| Example 25 | Y | 17.1 |
| Example 26 | Z | 16.0 |
| Example 27 | AA | 16.3 |
| Example 28 | AB | 15.3 |
| Example 29 | AC | 14.1 |
| Comparative Example 1 | a | 148 |

TABLE 6-continued

|  | Sample | MFR |
|---|---|---|
| Comparative Example 3 | c | 70.6 |

<Evaluation Test on Dispersibility into Resin>

A sample in amount of 300 g obtained in Example, 700 g of frozen-pulverized polyethylene resin (SUMIKATHENE L-211, manufactured by Sumitomo Chemical Co., Ltd.), and 12 g of zinc stearate were mixed. The mixture was melt-extruded with a twin screw extruder LABOPLAST MILL manufactured by Toyo Seiki Seisaku-sho, Ltd., at a preset resin temperature of 280° C., with a 1450-mesh screen installed on the discharge side, over 1 hour. The resin pressure was measured at the start of extrusion and after one-hour extrusion, and the difference was regarded as the resin pressure rise. The resin pressure rise thus measured was used as the index of dispersibility of the sample into the resin. In other words, as the value of the resin pressure rise decreases, the dispersibility of a sample into the resin is good. As shown in Table 7, it was found that the samples in Examples were good in dispersibility into a resin.

TABLE 7

|  | Sample | Resin pressure rise (MPa) |
|---|---|---|
| Example 22 | V | 4.4 |
| Example 23 | W | 0.6 |
| Example 24 | X | 1.2 |

From the evaluation results described above, it was found that a titanium dioxide pigment comprising 0.05 to 20 mass % of a compound including phosphorus and an alkaline earth metal present on the surface of titanium dioxide particles having an average particle diameter of 0.15 to 1.0 μm can reduce the amount of volatile moisture, having pigment performance such as high brightness. As a result, it is conceivable that the surface defects generally referred to as silver streaks (silver scratches), lacing (foaming), pinholes and the like resulting from the volatile moisture hardly occur when blended into a resin. It is also conceivable that the decomposition of a resin resulting from the volatile moisture can be suppressed, so that discoloration hardly occurs. What is more, it is conceivable that high brightness and excellent weather resistance/light resistance can be achieved.

INDUSTRIAL APPLICABILITY

The titanium dioxide pigment of the present invention is useful as a white pigment having pigment performances such as low yellowness and low yellowing degree due to exposure, namely good yellowing resistance, and high brightness. Furthermore, the titanium dioxide pigment of the present invention is useful as a white pigment blended into a resin because the volatile moisture can be reduced.

The invention claimed is:

1. A titanium dioxide pigment comprising titanium dioxide particles having an average particle diameter of 0.15 to 1.0 μm, wherein 0.05 to 20 mass % of a compound including phosphorus and calcium is present on surfaces of the titanium dioxide particles, wherein a value of (a BET diameter of the titanium dioxide pigment)/(a median diameter of the titanium dioxide pigment) is 0.04 or more.

2. The titanium dioxide pigment according to claim 1 wherein a value of (a difference (ppm) between a Karl Fischer moisture of the titanium dioxide pigment at 300° C. and a Karl Fischer moisture of the titanium dioxide pigment at 100° C.)/(a total amount (mass %) of an inorganic compound(s) present on a surface of the titanium dioxide pigment, the amount being used to treat the surface) is 3500 or less.

3. The titanium dioxide pigment according to claim 1, wherein a color difference Δb of a difference between a b-value of a powder color in a Hunter color system of the titanium dioxide pigment in which the compound including phosphorus and calcium is present and a b-value of a powder color in the color system of the titanium dioxide pigment before the compound including phosphorus and calcium is present is −0.1 or less.

4. The titanium dioxide pigment according to claim 1, wherein a compound including at least one element selected from the group consisting of silicon, aluminum, titanium, tin, zirconium, and antimony and the compound including phosphorus and calcium are present on the surfaces of the titanium dioxide particles.

5. The titanium dioxide pigment according to claim 4, wherein the compound including at least one element selected from the group consisting of silicon, aluminum, titanium, tin, zirconium and antimony is present on the surfaces of the titanium dioxide particles, and the compound including phosphorus and calcium is present on an outside thereof.

6. The titanium dioxide pigment according to claim 4, wherein the compound including phosphorus and calcium is present on the surfaces of the titanium dioxide particles, and the compound including at least one element selected from the group consisting of silicon, aluminum, titanium, tin, zirconium and antimony is present on an outside thereof.

7. The titanium dioxide pigment according to claim 4, wherein the compound including at least one element selected from the group consisting of silicon, aluminum, titanium, tin, zirconium and antimony is at least one selected from the group consisting of an oxide thereof, a hydroxide thereof, and a hydrous oxide thereof.

8. The titanium dioxide pigment according to claim 1, further comprising an organic compound, wherein the organic compound is attached to a surface of the titanium dioxide pigment.

9. The titanium dioxide pigment according to claim 8, wherein the organic compound is at least one organic compound selected from the group consisting of organosilicon compounds and polyols.

10. A method for manufacturing a titanium dioxide pigment according to claim 1 comprising:
mixing titanium dioxide particles having an average particle diameter of 0.15 to 1.0 μm, a phosphoric acid compound, and a calcium compound; and
attaching a compound including the phosphorus and the calcium to the titanium dioxide particles.

11. The method according to claim 10, comprising:
preparing an aqueous slurry including the titanium dioxide particles having an average particle diameter of 0.15 to 1.0 μm, the phosphoric acid compound, and the calcium compound; and
adjusting a pH of the aqueous slurry, thereby attaching the compound including the phosphorus and the calcium to the titanium dioxide particles.

12. A method for manufacturing the titanium dioxide pigment according to claim 1 comprising attaching a compound including phosphorus and calcium and a compound including at least one element selected from the group consisting of silicon, aluminum, titanium, tin, zirconium, and antimony to titanium dioxide particles having an average particle diameter of 0.15 to 1.0 μm.

13. The according to claim 12, comprising:
mixing the titanium dioxide particles and the compound including at least one element selected from the group consisting of silicon, aluminum, titanium, tin, zirconium and antimony, thereby attaching the compound including the at least one element to the titanium dioxide particles; and
subsequently mixing a phosphoric acid compound and a calcium compound, thereby attaching the compound including phosphorus and calcium to the titanium dioxide particles.

14. The method according to claim 12, comprising:
mixing the titanium dioxide particles, a phosphoric acid compound, and a calcium compound, thereby attaching the compound including phosphorus and calcium are attached to the titanium dioxide particles; and
subsequently mixing the titanium dioxide particles and the compound including at least one element selected from the group consisting of silicon, aluminum, titanium, tin, zirconium and antimony, thereby attaching the compound including the at least one element to the titanium dioxide particles.

15. The according to claim 12, wherein the compound including at least one element selected from the group consisting of silicon, aluminum, titanium, tin, zirconium and antimony is attached to the titanium dioxide particles and is at least one selected from the group consisting of an oxide thereof, a hydroxide thereof, and a hydrous oxide thereof.

16. A method for manufacturing a titanium dioxide pigment comprising further firing the titanium dioxide pigment manufactured by the method according to claim 10.

17. A method for manufacturing a titanium dioxide pigment comprising further attaching an organic compound to the titanium dioxide pigment manufactured by the method according to claim 10.

18. The method according to claim 17, wherein the organic compound is at least one organic compound selected from the group consisting of organosilicon compounds and polyols.

19. A composition comprising the titanium dioxide pigment according to claim 1.

20. A method for manufacturing a titanium dioxide pigment comprising further firing the titanium dioxide pigment manufactured by the method according to claim 12.

21. A method for manufacturing a titanium dioxide pigment comprising further attaching an organic compound to the titanium dioxide pigment manufactured by the method according to claim 12.

22. The method for manufacturing a titanium dioxide pigment according to claim 21, wherein the organic compound is at least one organic compound selected from the group consisting of organosilicon compounds and polyols.

* * * * *